United States Patent [19]
Crisafulli

[11] 3,923,661
[45] Dec. 2, 1975

[54] OIL SKIMMER WITH LEAD FLOAT AND HINGED WEIR

[76] Inventor: Angelo J. Crisafulli, Box 1051, Glendive, Mont. 59330

[22] Filed: June 28, 1974

[21] Appl. No.: 485,147

[52] U.S. Cl. .................................................. 210/242
[51] Int. Cl.² ........................................... E02B 15/04
[58] Field of Search ....... 210/169, 83, 242, DIG. 21

[56] References Cited
UNITED STATES PATENTS

| | | | |
|---|---|---|---|
| 2,497,177 | 2/1950 | McClintock et al. | 210/242 X |
| 3,547,553 | 12/1970 | Stanfield | 210/DIG. 21 |
| 3,567,020 | 3/1971 | Whitaker | 210/169 |
| 3,682,316 | 8/1972 | Waren | 210/242 |
| 3,688,909 | 9/1972 | Titus et al | 210/242 |
| 3,693,801 | 9/1972 | Pogonouski | 210/242 |
| 3,704,784 | 12/1972 | Craggs et al. | 210/DIG. 21 |
| 3,716,873 | 2/1973 | Blum | 210/169 |
| 3,722,687 | 3/1973 | Stebbins et al. | 210/DIG. 21 |
| 3,757,953 | 9/1973 | Sky-Eagle, Jr. | 210/DIG. 21 |
| 3,785,496 | 1/1974 | Smith, Jr. | 210/DIG. 21 |

*Primary Examiner*—Theodore A. Granger
*Attorney, Agent, or Firm*—Clarence A. O'Brien; Harvey B. Jacobson

[57] ABSTRACT

A two-part skimming device for removing a layer of oil or other floating pollutants from the surface of a body of water, one part being a generally U-shaped flotation or pontoon unit, and the other part being a combined collecting and pumping unit having a hingedly mounted weir plate and a lead float to control the position of the weir plate in relation to the surface of the water. An adjustable mounting for the collecting and pumping unit includes pockets in the flotation unit receiving threaded bolt members which in turn are received in threaded apertures in part of the supporting structure for the weir plate, to aid in varying, in gradual steps, the vertical position of the same, and the lead float is connected to the hinged weir plate and provides "fine" adjustment (response) to variations in wave height.

6 Claims, 4 Drawing Figures

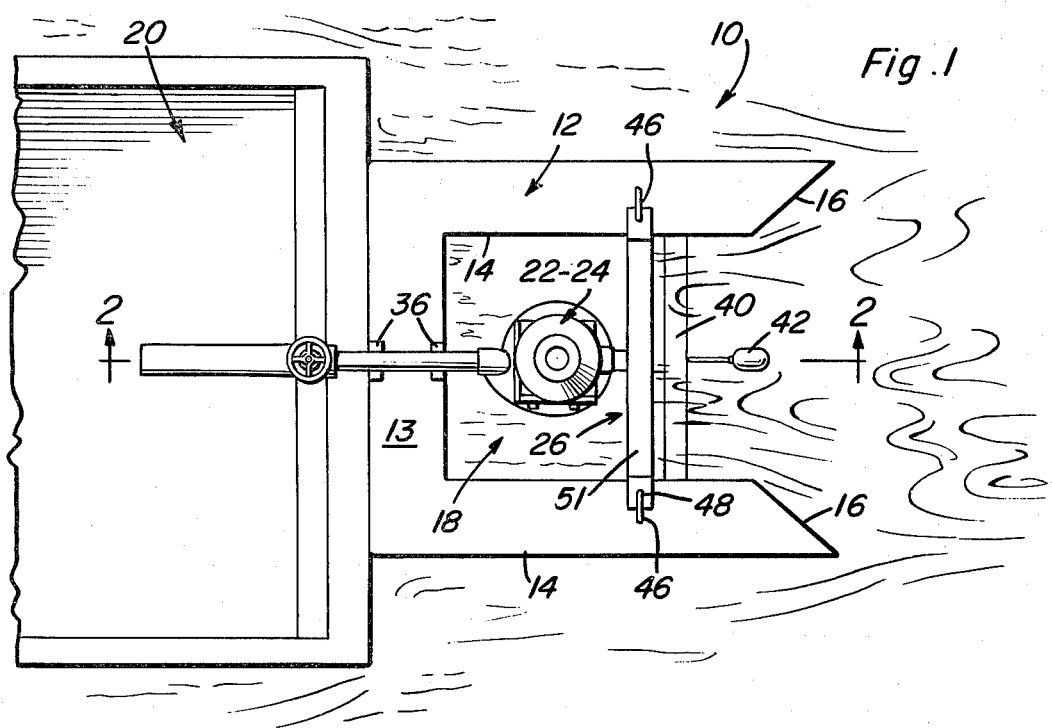
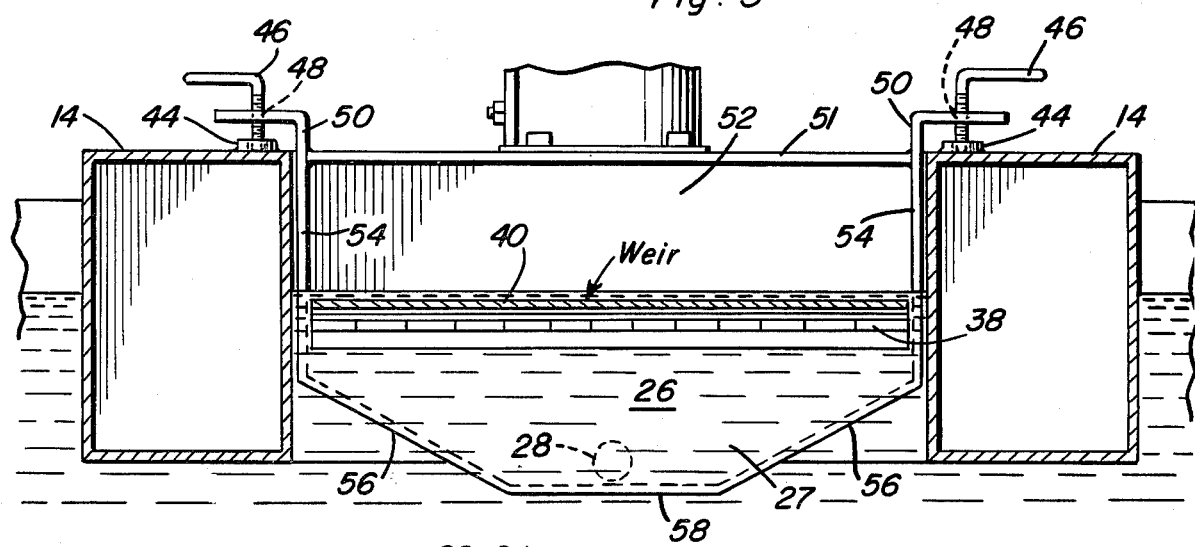
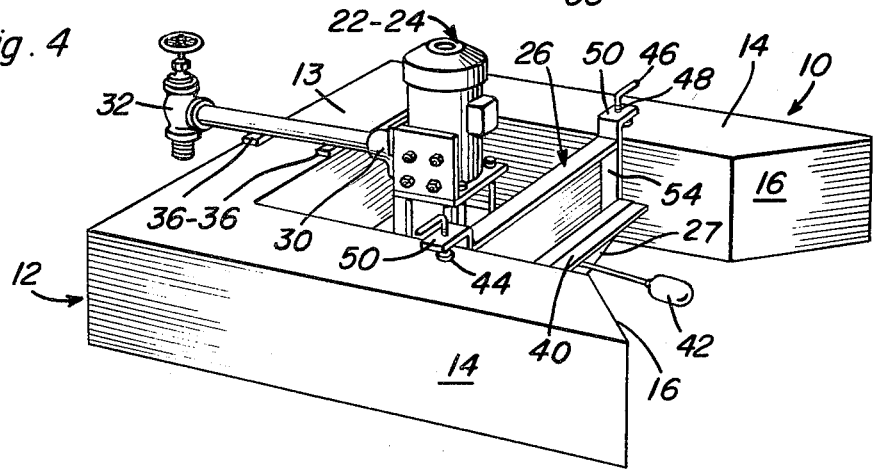

3,923,661

OIL SKIMMER WITH LEAD FLOAT AND HINGED WEIR

RELATED APPLICATIONS

This application is related to my copending application Ser. No. 330,079, filed Feb. 6, 1973 now U.S. Pat. No. 3,822,789 issued July 9, 1974, and to my U.S. Pat. No. 3,756,414, issued Sept. 4, 1973.

FIELD OF THE INVENTION AND SUMMARY OF THE PRIOR ART

All of the prior art cited in my copending application, Ser. No. 330,079, filed Feb. 6, 1973, and in my U.S. Pat. No. 3,746,414 are incorporated herein by reference. In addition, note is made of the Hirs (U.S. Pat. No. 3,303,932, issued Feb. 14, 1967), Valdespino (U.S. Pat. No. 3,615,017, issued Oct. 26, 1971), and Brittingham (U.S. Pat. No. 3,664,505, issued May 23, 1972) patents showing various forms of skimmers including concentric containers, entrapment towers, and pressure means to aid in separation; the winch assemblies for adjusting the scoop means of Menkee (U.S. Pat. No. 3,268,081, issued Aug. 23, 1966); the endless conveyor belt with an affinity for oil of Sharpton (U.S. Pat. No. 3,643,804, issued Feb. 22, 1972); and, the plural weirs and plural swash plates of Sorensen (U.S. Pat. No. 3,662,505, issued May 16, 1972).

SUMMARY OF THE INVENTION

Among the objects and advantages of my present invention are the following:

1. To provide a relatively small skimmer that can be rapidly transported (air-dropped, if necessary) to the area needing skimming urgently, and begin operation before extensive damage occurs.
2. To provide plural, diverse means for insuring that the level of the weir plate with respect to the surface of the surrounding water is responsive to the wave activities in the adjacent waters.
3. To provide an easily assembled two-part unit making both initial costs and replacement costs more economical.
4. To provide a self-contained power unit to operate the pump and associated discharge structure.
5. To provide connecting and conduit means that will effectively contain the gathered pollutants.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the skimmer.

FIG. 3 is a sectional view taken approximately along the line 3—3 of FIG. 2.

FIG. 4 is a perspective view of the two-part unit, out of the water, and not associated with an accompanying receiving vessel.

DETAILED DESCRIPTION OF THE INVENTION

Figure 2:
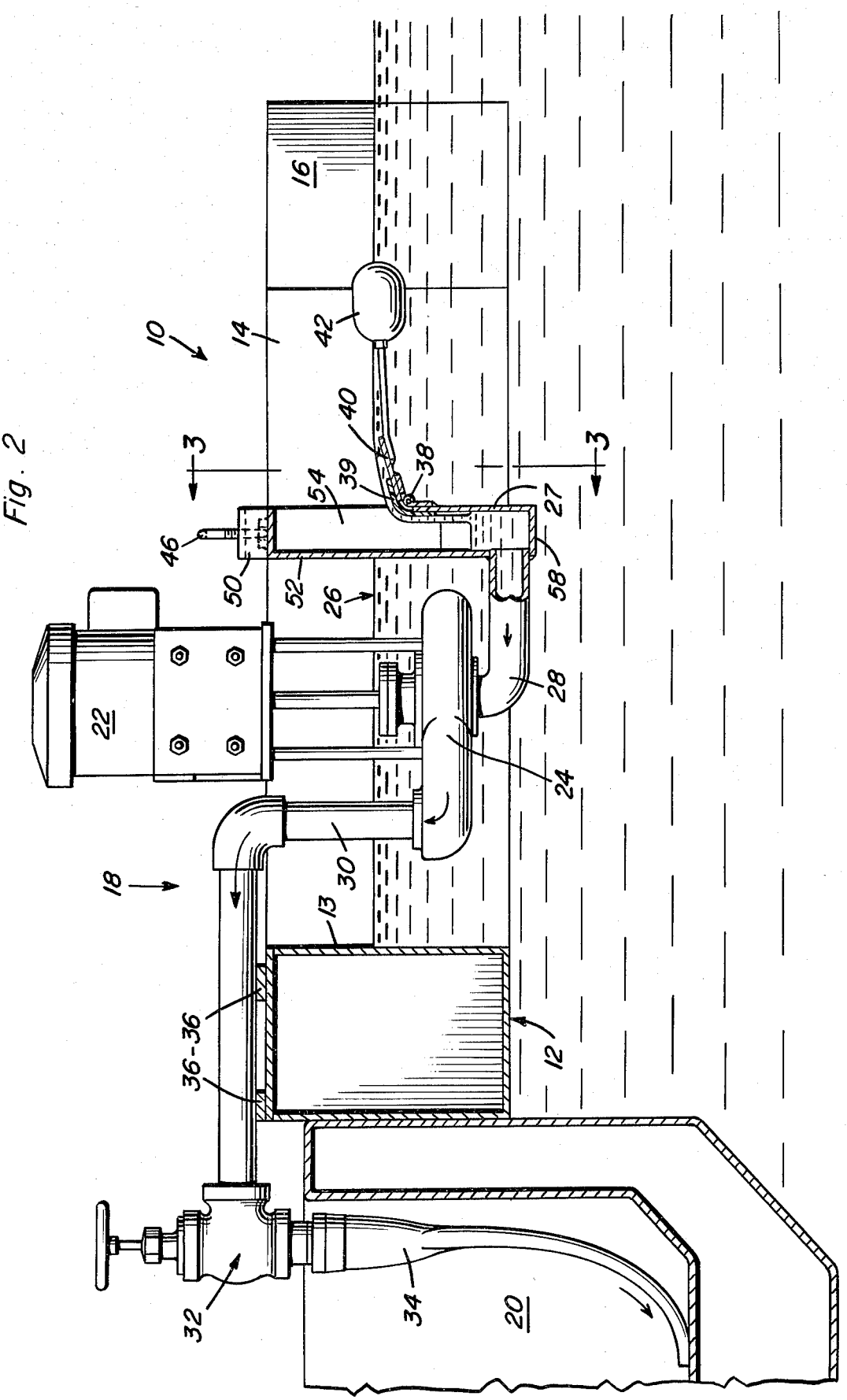
FIG. 2 is a detailed view on an enlarged scale, partly in cross section, taken approximately along the line 2—2 of FIG. 1.

The two-part skimmer is represented throughout by reference numeral 10 and includes a forwardly opening, generally U-shaped, flotation unit 12 having a rear, transverse bight portion 13 and forwardly extending legs 14—14, each leg 14 having an inwardly inclined front wall 16 to guide pollutants between the legs. The legs 14 and bight portion 13 may be hollow, cellular or otherwise constructed so they will maintain their buoyancy.

The other unit of the two-part skimmer 10 is a collecting and pumping unit 18 which includes a self-contained power source 22, preferably an electric motor, however other known power sources (not illustrated) would suffice and a centrifugal pump 24 is driven by motor 22 and pumps pollutants and water from a container 26 through an inlet pipe 28 into further conduit means 30 to a valve-controlled piping arrangement 32, and through further conduit means 34 into the receiving vessel 20. The vessel 20 may be remote or the pump may discharge to a tank or the like on shore. The conduit means 30 is secured to the upper surface of the bight portion 13 of the flotation unit 12 approximately midway between the legs 14—14, and centrally of the open portion of the U-shaped flotation unit 12. The securing means 36—36 may be of plastic, rubber, or a similar material that is resistant to the pollutants encountered and sufficiently resilient or springy to act as cushioning means as well as securing means and means to enable vertical adjustment of the container 26. Suitable adhesive or strap means may be used for securing the resilient material in place. In some instances, the pipe or conduit 30 merely lays against the upper surface of flotation unit 12 and members 36 may be in the form of spacers.

A hinge 38 pivotally connects weir plate 40 to the upper edge of a short front wall 27 of the container 26 with a flexible cover 39 provided for the hinge, and a lead float 42 attached to the lower surface of weir plate 40 provides a control responsive to the water conditions immediately preceding the weir plate to keep the level of the weir plate at an appropriate level with respect to the pollutants floating on the surface of the adjacent waters.

The container 26 is suspended from the flotation unit 12 by pockets 44 (either smooth bored, or threaded, depending upon the desired depth of each pocket) located approximately midway (front to rear) of each leg 14 which receive the lower ends of threaded and handled L-shaped bolts 46—46. Threaded apertures 48—48 in the angled projecting lugs 50—50 extending upwardly and outwardly from the top wall 51 on the container 26, threadably receive the bolts 46—46 to initially adjustably position container 26 with respect to the flotation unit 12. The container 26 includes a rear wall 52 paralleling the front wall 27 and being connected thereto by side walls 54, slanted bottom walls 56 and horizontal bottom wall 58 which cooperate to define a sump to which the pump inlet pipe 28 is connected.

As may be readily discerned from the above, the two-part unit 10 may be rapidly transported, air-dropped if necessary, to an area in immediate and urgent need of pollution control. Any nearby vessel having sufficient vacant capacity to receive the pumped pollutants from skimmer 10 may be used as the vessel 20. Upon observing the water conditions, the operator may make the initial and "rough" adjustment of the depth of the container 26 and weir plate 40, via the threaded bolts 46—46, the lead float 42 providing the "fine" adjustment for the weir plate, being responsive to the waters in the immediate vicinity of the open forward portion of flotation unit 12. The float 42 may be varied in relation to the weir on the weir plate by bending its mounting rod to provide additional adjustment for the thickness of the layer of water and pollutants that is skimmed from the surface of the water with the float more precisely maintaining this thickness even though the surface of the water becomes disturbed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An oil skimmer adapted to be supported in a body of water having floating pollutants thereon for removing the pollutants and an adjacent thin layer of water therewith, said skimmer comprising a sump including means orienting the same so that at least a portion thereof remains below the surface of the water, said sump including an inlet opening having a lower edge disposed below the surface of the water and defining a gravity inlet for a thin layer of water and the pollutants floating therein, pump means communicating with the portion of the sump below the surface of the water for removing water and pollutants collected therein and discharging them into a desired location for subsequent separation, a weir plate hingedly attached to the lower edge of said inlet opening into said sump, a float extending forwardly from said weir plate for controlling the pivotal position of the weir plate in relation to the surface of the water, said sump being in the form of a container defined by a substantially vertical rear wall, a front wall parallel to the rear wall, side walls interconnecting the front and rear walls and a bottom wall interconnecting the front, rear and side walls, said front wall being shorter than the rear wall with the top edge of the front wall defining the bottom edge of the inlet opening, said weir plate being hingedly attached to the upper edge of the front wall for free swinging movement about a transverse axis, said float including a bendable mounting rod attached to the undersurface of the forward edge of the weir plate and extending forwardly therefrom and having the float attached to the forward end thereof, and a cover of flexible material connected with the rear upper surface of the weir plate and the upper inner surface of the front wall in covering relation to the hinge connection between the weir plate and the top edge of the front wall.

2. The structure as defined in claim 1 wherein said bottom wall of the container includes upwardly slanting side portions whereby water and pollutants entering the container will be conveyed to the central portion of the bottom wall thereof, said pump means including a centrifugal pump oriented rearwardly of the rear wall of the container with the rotational axis of the centrifugal pump being substantially vertical, an inlet pipe extending from the central bottom portion of the rear wall of the container and the inlet of the centrifugal pump, a discharge pipe communicated with the centrifugal pump for discharging water and pollutants therefrom, and means connected to the centrifugal pump and supported thereon for driving the centrifugal pump.

3. The structure as defined in claim 2 wherein said container includes a top wall, each end of the top wall of the container including outwardly projecting supporting lugs rigid therewith, screw-threaded members extending vertically through said lugs for vertical adjustment in relation thereto, the upper ends of said screw-threaded members including handles, and support means engaging the lower ends of the screw-threaded members for enabling adjustment of the container vertically in relation to the support means.

4. The structure as defined in claim 3 wherein said support means is in the form of a horizontally disposed, substantially U-shaped flotation unit including a rearward bight portion and forwardly extending legs, said container extending between the legs of the flotation unit with the lugs overlying the top surfaces of the legs of the flotation unit with the lower ends of the screw-threaded members engaging the top surfaces of the legs of the U-shaped flotation unit, said pump being oriented between the container and the bight portion of the flotation unit with the discharge pipe from the pump extending above and resting on the top surface of the bight portion of the U-shaped flotation unit.

5. The structure as defined in claim 4 wherein the forward ends of the legs of the U-shaped flotation unit are beveled inwardly and rearwardly to guide water and pollutants between the legs and into the container, said container having a narrow dimension from front-to-rear as compared with the length of the legs of the U-shaped flotation unit, said float being oriented generally in alignment with the rearward ends of the beveled ends of the legs of the flotation unit for controlling the position of the forward end of the weir plate in response to the surface of the water between the forward end portions of the legs of the U-shaped flotation unit, said float and mounting rod being disposed centrally between the end edges of the weir plate with the mounting rod being bendable to adjust the relationship between the float and the weir plate, the upper surface of the legs of the flotation unit including sockets receiving the lower ends of the threaded members in a detachable member to enable removal of the container, weir plate, float, pump and its associated motor, inlet pipe and discharge pipe from the flotation unit thus enabling the flotation unit and the container and related structure to be easily separated and re-assembled to facilitate conveyance of the assembly to a site for use.

6. In combination with a floating vessel having means incorporated therein for receiving water and pollutants, a skimmer disposed forwardly of the vessel, said skimmer including a generally U-shaped flotation unit having a horizontal bight portion extending transversely of the bow of the vessel and forwardly extending parallel legs, a collecting and pumping unit supported between the legs of the flotation unit forwardly of the bight portion, said collecting and pumping unit including a transversely extending container disposed vertically between the legs and including projecting means thereon supportingly engaging the upper surfaces of the legs in a manner to permit removal thereof, said container including a front wall having an upper edge terminating below the level of the water in which the flotation unit and collecting and pumping unit is positioned, a transversely extending weir plate having its rear edge attached to the upper edge of the front wall by a hinge structure, the forward edge of said weir plate being swingable to vary its position in relation to the surface of the water, a mounting rod extending forwardly from and rigid with the weir plate, a float rigidly connected to the mounting rod in remote relation to the forward edge of the weir plate for controlling the position of the forward edge of the weir plate in relation to the surface of the water for skimming any pollutants floating in the water at the upper surface thereof and a predetermined layer of water whereby such pollutants and water will flow by gravity into the container, a pump and drive unit connected with the container with the pump being in communication with the bottom portion of the container and including a discharge pipe extending rearwardly beyond the bight portion of the flotation unit for discharge of water and pollutants into the floating vessel, said collecting and pumping unit being separable as a unit from the flotation unit to enable the two components to be separately transported and assembled at a site for use, and threaded members extending vertically through said lugs and having lower ends engaged adjustably with the outer surfaces of the legs of the flotation unit to vary the vertical position of the upper edge of the front wall in relation to the surface of the water, the hinge connection between the weir plate and the upper edge of the front wall of the container being provided with a flexible covering member, said upper edge of the front wall of the container and said weir plate extending substantially completely between the inner surfaces of the legs with the container being oriented rearwardly of the forward ends of the legs, said mounting rod and float being disposed centrally of the weir plate with the float being disposed forwardly of the weir plate but rearwardly of the forward ends of the legs.

* * * * *